June 11, 1940.  M. ROMAINE  2,203,798
BROACHING MACHINE
Filed Nov. 23, 1936  7 Sheets—Sheet 1
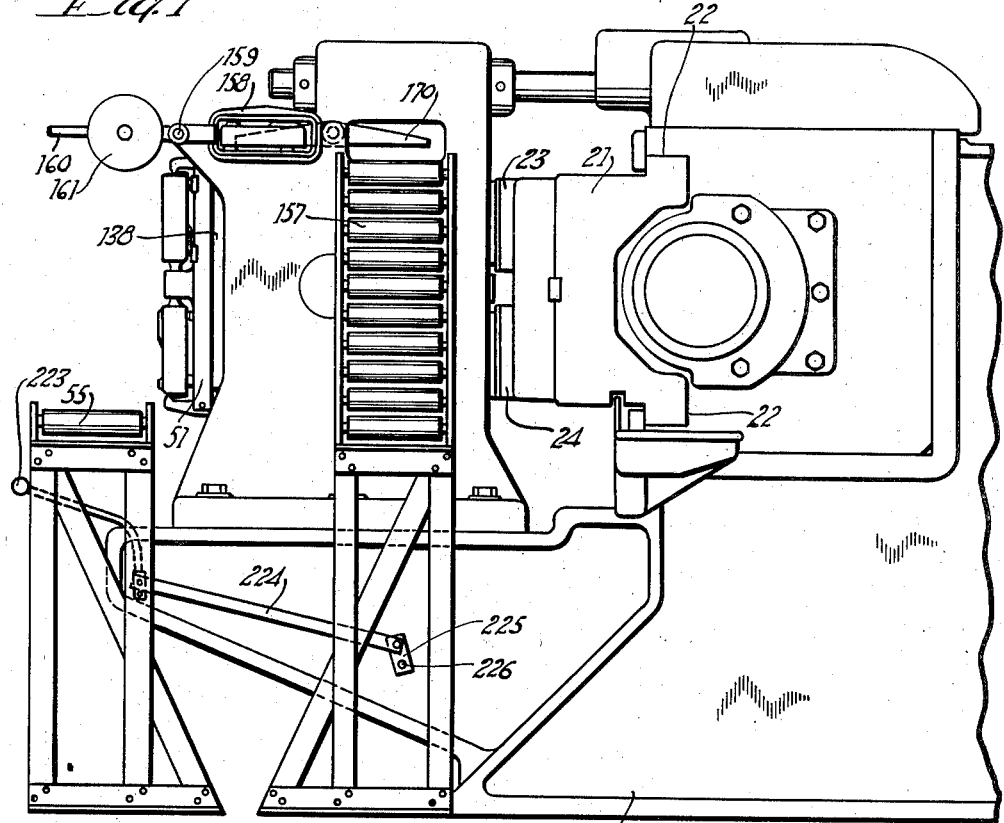
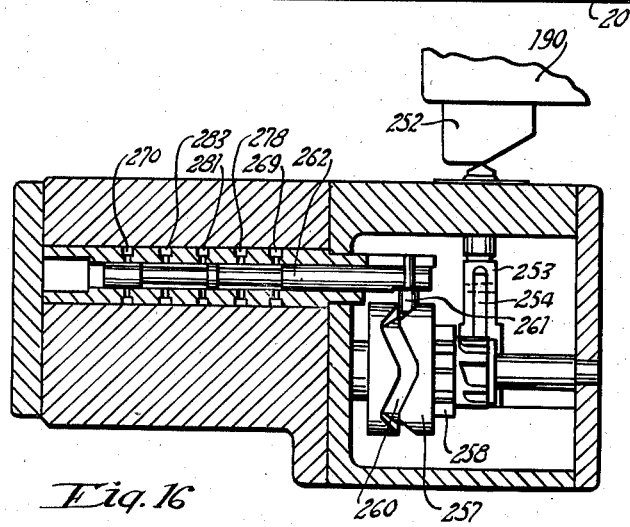
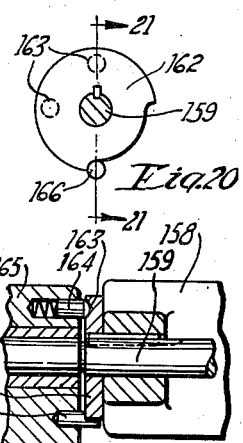
INVENTOR.
MILLARD ROMAINE
BY
ATTORNEY.

June 11, 1940.    M. ROMAINE    2,203,798
BROACHING MACHINE
Filed Nov. 23, 1936    7 Sheets-Sheet 2
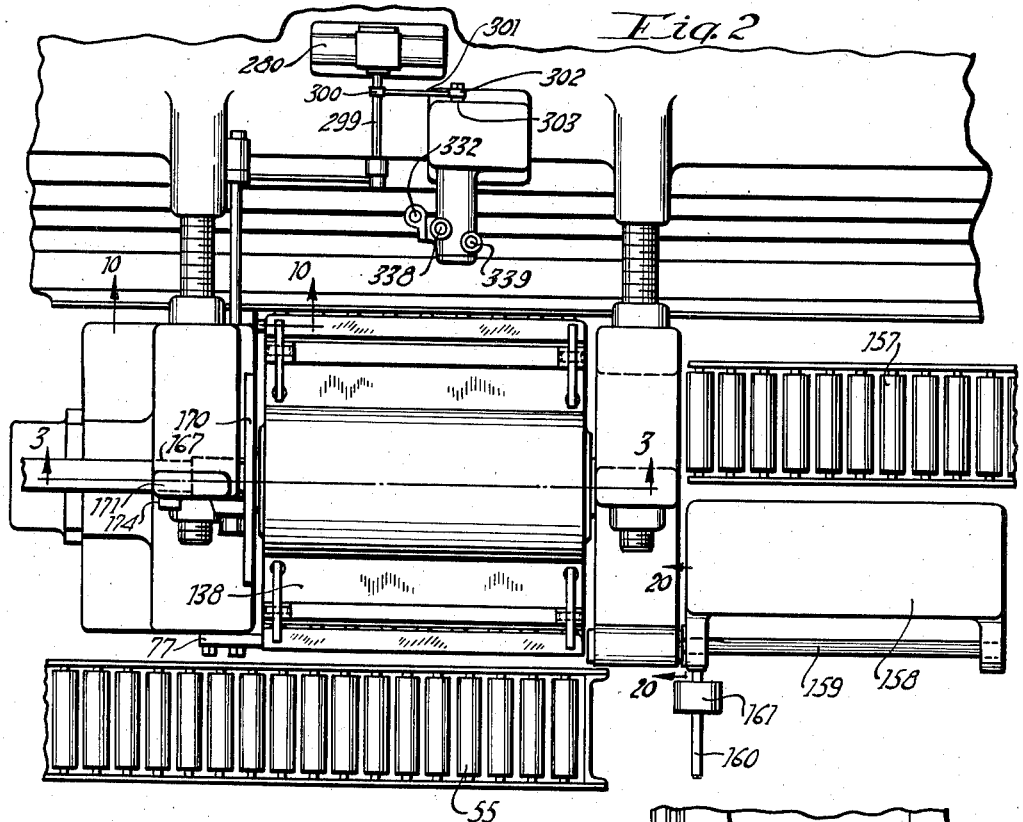
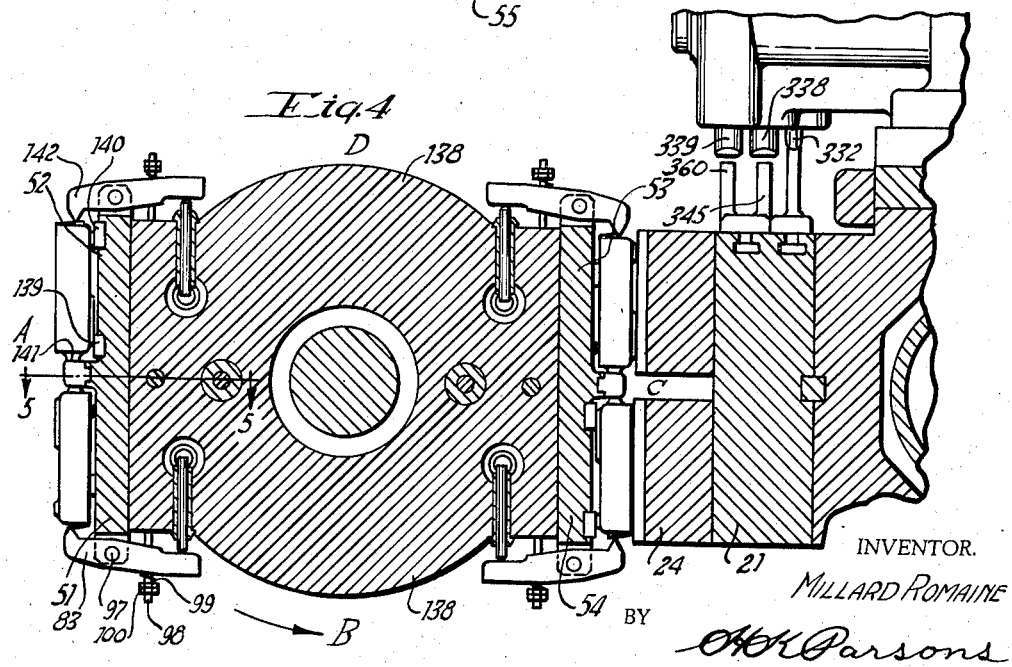
INVENTOR.
MILLARD ROMAINE
BY
A. H. Parsons
ATTORNEY.

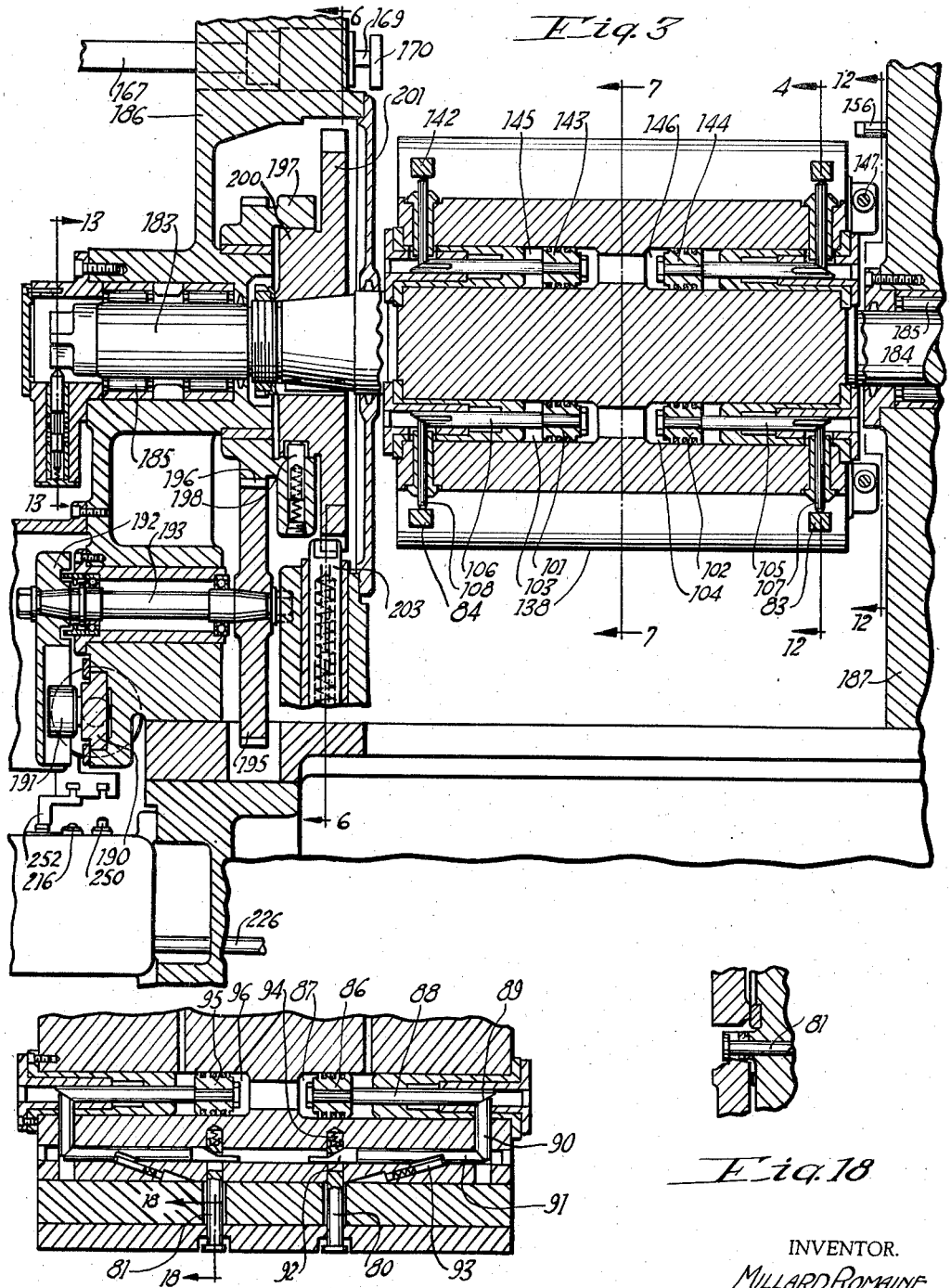

June 11, 1940. M. ROMAINE 2,203,798
BROACHING MACHINE
Filed Nov. 23, 1936 7 Sheets-Sheet 4

INVENTOR.
MILLARD ROMAINE
BY
AHK Parsons
ATTORNEY.

June 11, 1940. M. ROMAINE 2,203,798
BROACHING MACHINE
Filed Nov. 23, 1936 7 Sheets-Sheet 5
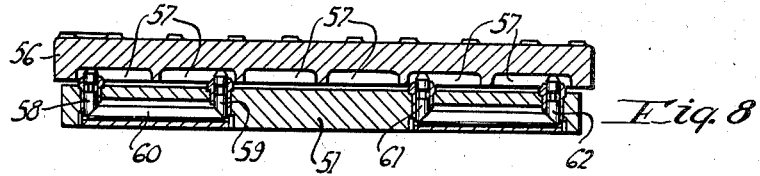
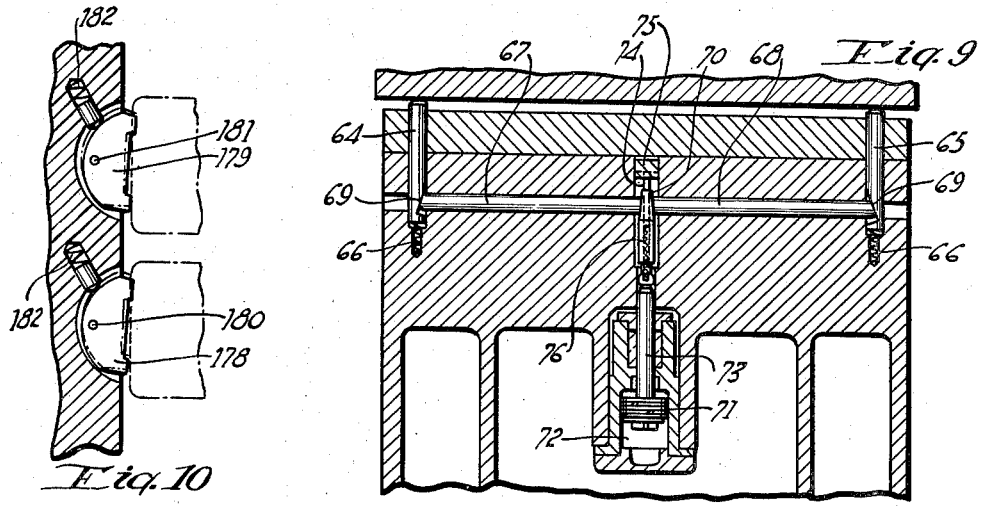
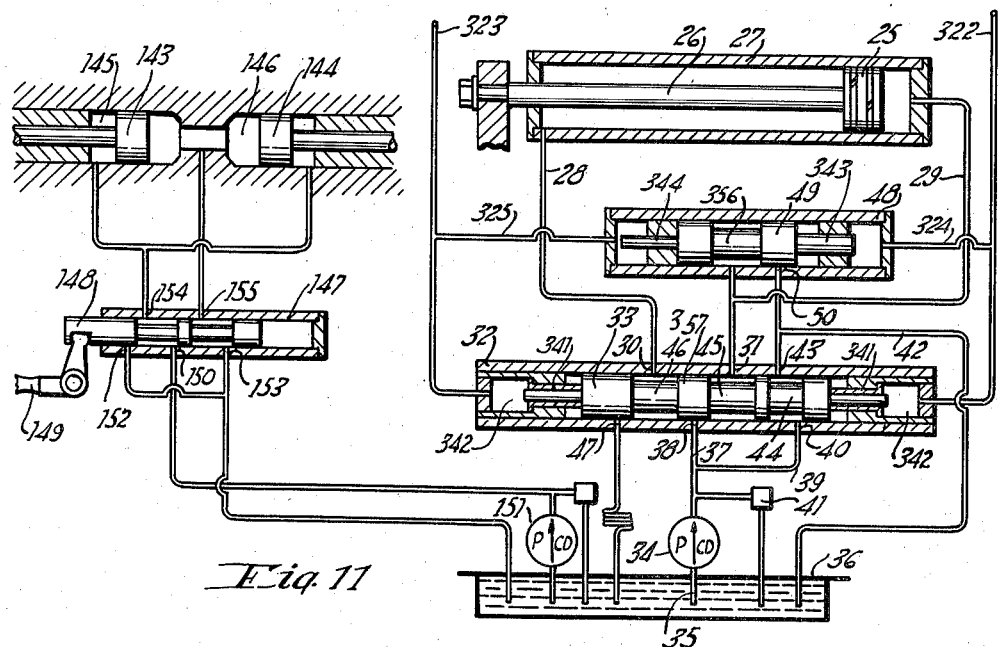
INVENTOR.
MILLARD ROMAINE
BY
H. H. Parsons
ATTORNEY.

June 11, 1940.                    M. ROMAINE                    2,203,798
                              BROACHING MACHINE
                           Filed Nov. 23, 1936              7 Sheets-Sheet 6
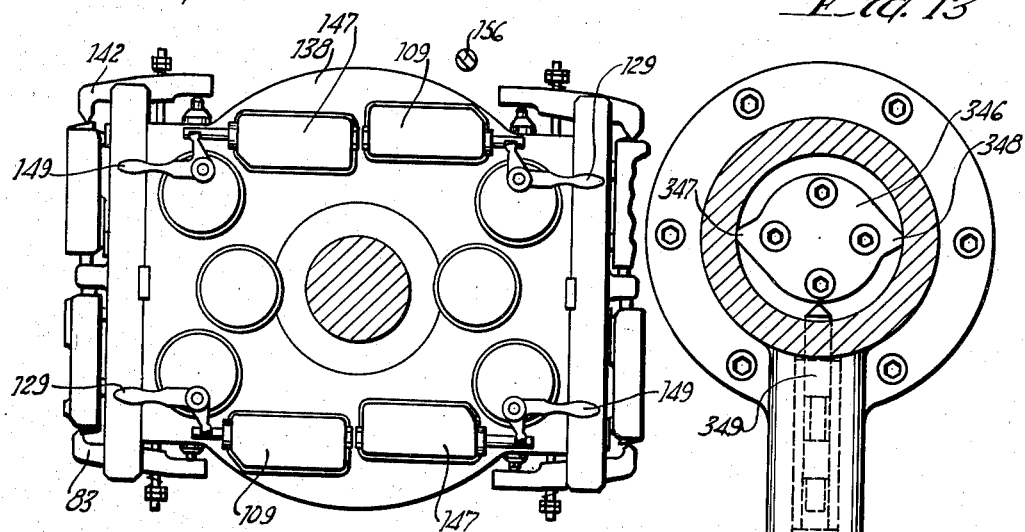
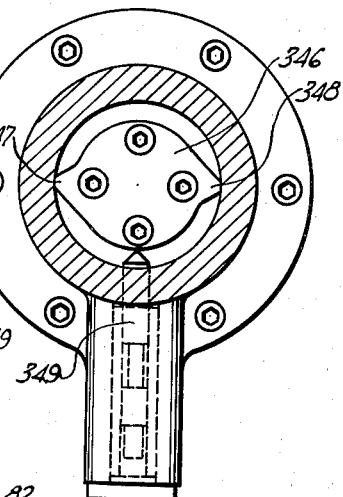
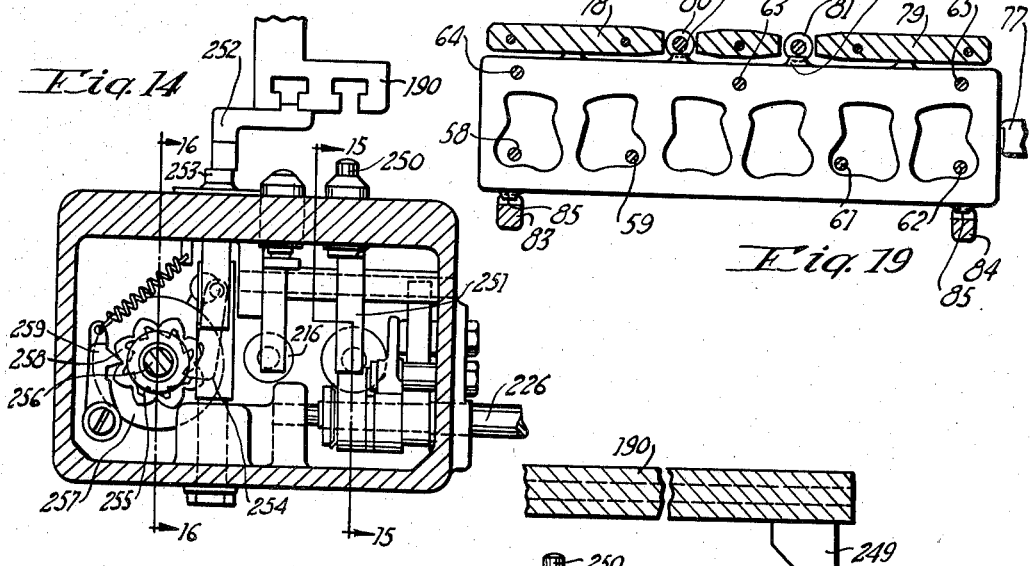
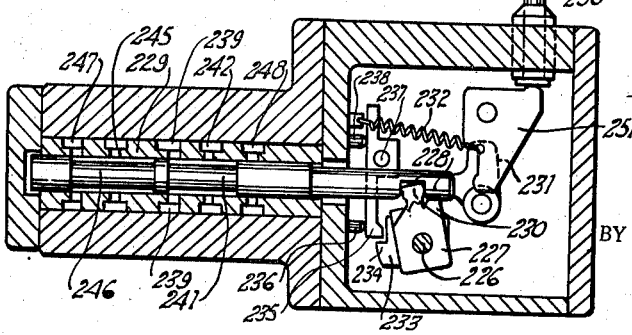
INVENTOR.
MILLARD ROMAINE
BY
A. K. Parsons
ATTORNEY.

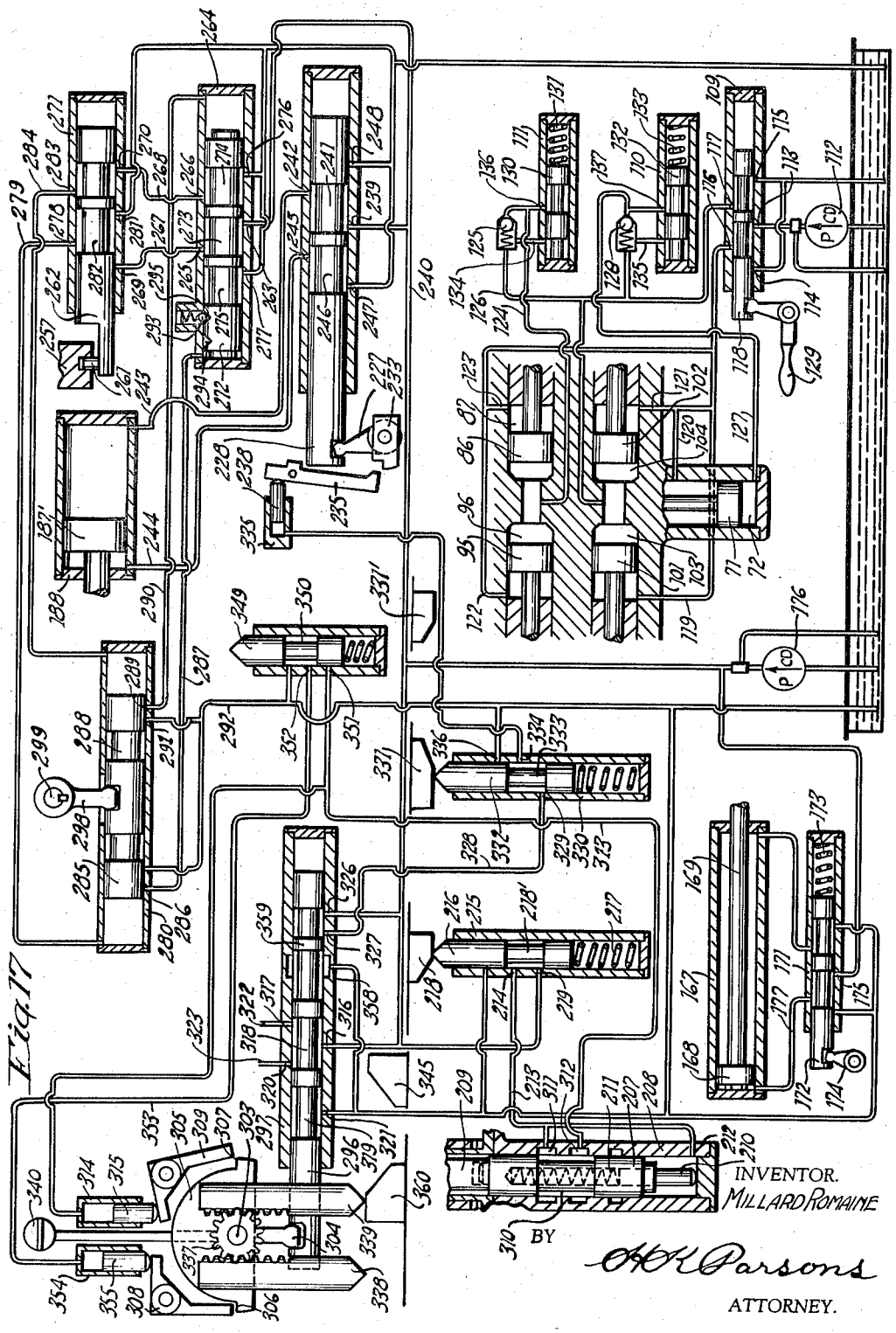

Patented June 11, 1940

2,203,798

UNITED STATES PATENT OFFICE 2,203,798

BROACHING MACHINE

Millard Romaine, Cincinnati, Ohio, assignor to The Cincinnati Milling Machine Company, Cincinnati, Ohio, a corporation of Ohio Application November 23, 1936, Serial No. 112,203

11 Claims. (Cl. 90—33)

This invention relates to broaching machines and more particularly to improved means for presenting work to broaching tools.

One of the objects of this invention is to provide a machine in which work having two opposing faces to be broached may with facility be presented to the broaching tools with a minimum amount of handling.

Another object of this invention is to provide a novel mechanism for turning work without requiring any lifting on the part of the operator.

A further object of this invention is to provide an improved indexible work holder mechanism which is especially adaptable for broaching purposes.

An additional object of this invention is to provide an improved interlocking mechanism between an indexible work holder and a broaching ram, whereby the ram can not be power operated during indexing, or the work holder can not be power indexed during the reciprocation of the ram.

Still another object of this invention is to provide means whereby the broaching ram will be automatically stopped at each end of its stroke and thereby insure that the work fixture is in proper condition to be indexed, which thereby safeguards the operator.

Another object of this invention is to provide a work holder with improved locking and power clamping means.

Other objects and advantages of the present invention will be readily apparent by reference to the following specification, considered in conjunction with the accompanying drawings illustrative of one embodiment thereof, but it will be understood that any modifications can be made in the specific structural details without departing from or exceeding the spirit of the invention.

Referring to the drawings in which like reference numerals indicate like or similar parts:

Figure 1 is an end elevation of a broaching machine embodying the principles of this invention.

Figure 2 is a plan view of a portion of the machine showing more particularly the work holder and associated conveyors.

Figure 3 is a vertical section through the work holder taken on the line 3—3 of Figure 2.

Figure 4 is a section on the line 4—4 of Figure 3.

Figure 5 is a section on the line 5—5 of Figure 4.

Figure 8 is a detail section as viewed on the line 8—8 of Figure 7.

Figure 9 is a detail section on the line 9—9 of Figure 7.

Figure 10 is a detail section on the line 10—10 of Figure 2.

Figure 11 is a diagram of the hydraulic operating circuit for the broaching ram, and one of the work clamp control circuits.

Figure 12 is an end view of the work holding drum as viewed on the line 12—12 of Figure 3.

Figure 13 is a detail sectional view on the line 13—13 of Figure 3.

Figure 14 is a section on the line 14—14 of Figure 6.

Figure 15 is a section on the line 15—15 of Figure 14.

Figure 16 is a section on the line 16—16 of Figure 14.

Figure 17 is a diagram of the hydraulic control and interlocking circuit of the machine.

Figure 18 is a detail section on the line 18—18 of Figure 5.

Figure 19 is a section on the line 19—19 of Figure 7.

Figure 20 is a detail section on the line 20—20 of Figure 2.

Figure 21 is a detail section on the line 21—21 of Figure 20.

Figure 6:
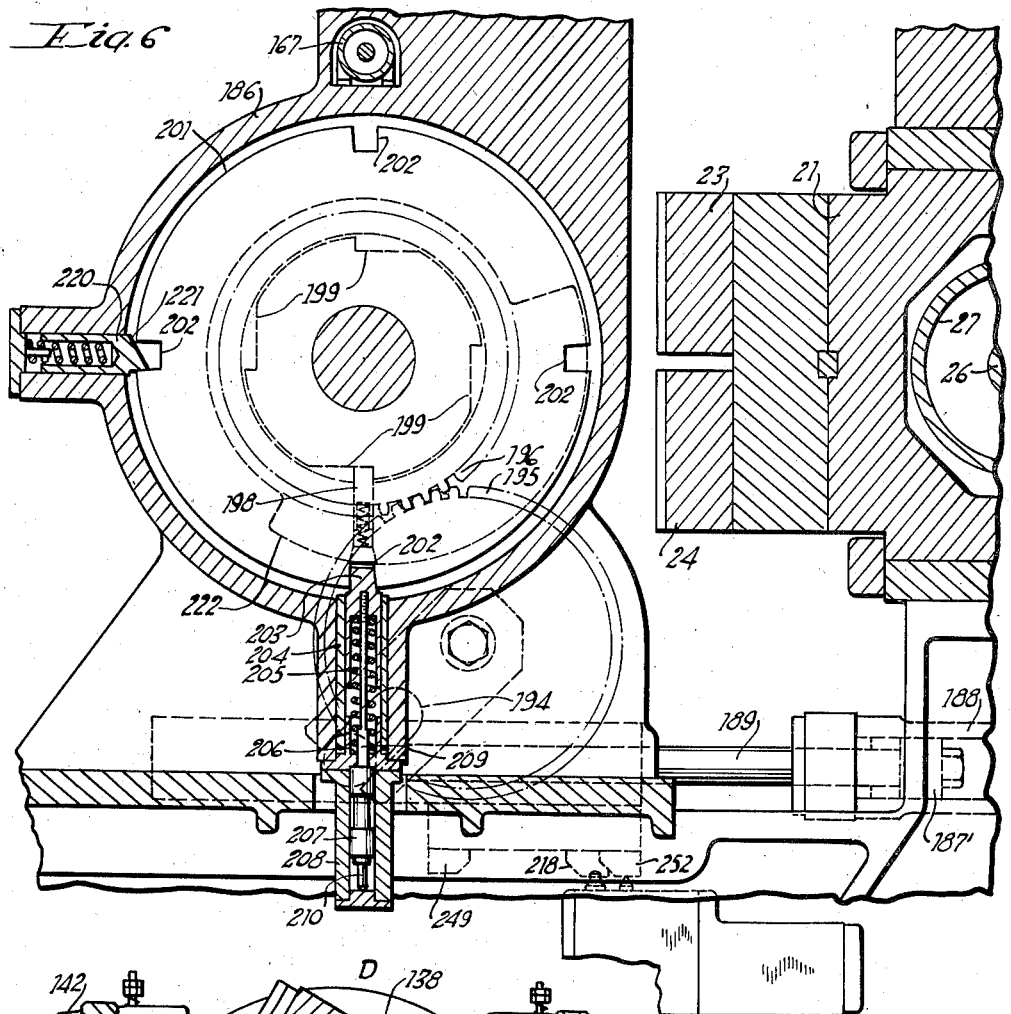
Figure 6 is a section on the line 6—6 of Figure 3 showing the details of the indexing mechanism.
Figure 7:
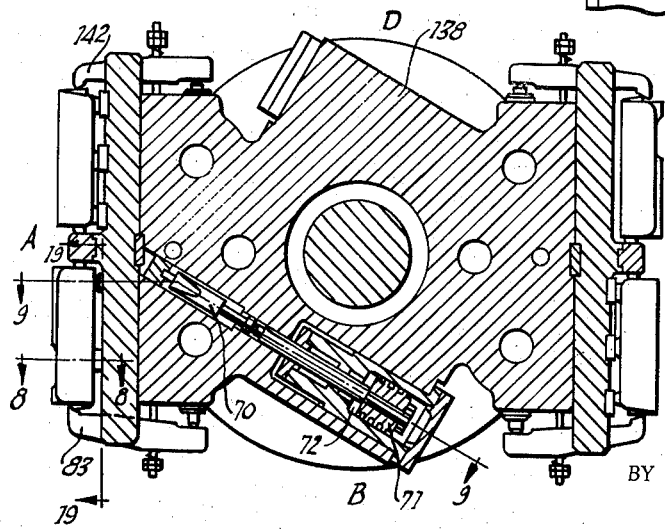
Figure 7 is a vertical section through the work holding drum and taken on the line 7—7 of Figure 3.

The general structure of the machine embodying the principles of this invention is shown in Figure 1 of the drawings, and comprises, in general, a base or main support 20 upon which a ram 21 is reciprocably mounted in horizontal guideways 22. This ram carries two broaching tools 23 and 24, each of which is wide enough to broach one face or side of a work piece. This ram is reciprocated by a piston 25 shown in Figure 11, which is connected to the ram by a piston rod 26.

The piston reciprocates in a cylinder 27 which, as shown in Figure 1, is attached to the main support 20.

Referring again to Figure 11, the opposite ends of cylinder 27 are connected by channels 28 and 29 to ports 30 and 31 of a three-position control valve 32, the plunger 33 of which has a central or stop position, a feed position on one side of the stop position, and a return position on the other side of said stop position.

Fluid pressure for operating the piston is supplied by a constant displacement pump 34, having an intake 35 through which fluid is withdrawn from a reservoir 36, and a delivery pipe 37 which is connected to the supply port 38 of the valve 32. The line 37 also has a branch 39 connected to a second supply port 40 of valve 32. If so desired, an emergency relief valve 41 may be connected to the channel 37 for permitting excess fluid to be returned to the reservoir 36. A return channel 42 is connected to port 43 of the valve.

When the plunger 33 is in its stop position, in which it is shown in Figure 11, the pressure port 40 is connected by cannelure 44 to port 43 and thereby to reservoir, whereby undue pressure will not build up in the system when the ram is stopped.

When the plunger 33 is shifted to the left of the position shown in Figure 11, port 38 is connected to port 31 by the cannelure 45 in plunger 33 and fluid pressure is admitted to the right hand end of cylinder 27, thereby moving the ram to the left on a broaching or cutting stroke. The fluid in the left hand end of cylinder 27 is returned to reservoir through channel 28, whose terminal port 30 is connected at this time by cannelure 46 to the return port 47.

When the plunger 33 is shifted to the right to its return position, fluid pressure from the pump is delivered to channel 28 through interconnection of ports 30 and 38 to cause the piston 25 to move toward the right. At this time the port 31 is isolated for interlocking purposes, and therefore a shuttle valve 48 has been provided having a plunger 49 which will be in a position to connect the channel 29 to a branch line 50 of return line 42. For present purposes it will now be apparent that the operation of the broaching ram is controlled by a valve which has three positions for respectively effecting a feeding movement to the left, a stop, and a rapid return movement to the right, the rapid return movement automatically resulting from the piston differential because the piston rod 26 only passes through one end of the cylinder.

The machine of this invention is especially designed for broaching work pieces on two opposed sides, but in order to increase the productive capacity of the machine it is so arranged that two work pieces are broached simultaneously, but on opposite sides respectively. In addition, the work pieces, which happen in this instance to be cast iron cylinder heads, are heavy to handle and to prevent physical exhaustion of the operator in turning these work pieces over after one side has been broached, means have been provided for assisting in this operation by eliminating the necessity for the operator to lift the work pieces in order to reverse them. To these ends an indexible work fixture has been provided, which is in the form of a rotatable drum, as more particularly shown in Figures 2, 3, 4, 7, and 12 to which reference may now be had.

As shown in Figure 4 the drum has four work receiving fixtures indicated generally by the numerals 51, 52, 53, and 54. As viewed in Figure 4, the drum rotates when indexed in a counterclockwise direction, and is indexed 90° at a time which means that there are four stations A, B, C, and D through which the fixtures successively pass. In other words station A, as viewed in Figure 4, would be the loading station because the work coming in on the conveyor 55 is transferred from the conveyor into fixture 51. These work pieces are rough castings, and it is desired that they be so mounted in the fixture that the depth of the combustion chambers will be held uniform.

In Figure 8, the work piece is indicated by the reference numeral 56, and the series of combustion chambers by the numeral 57. As there shown, the fixture 51 is provided with a pair of equalizing plungers 58 and 59, the exposed ends of which engage the top walls of the two combustion chambers at one end when the work piece is placed in the fixture and the opposite ends of the plungers are beveled to engage the beveled ends of an equalizing rod 60. This tends to average out any slight variations in longitudinal alignment of these walls, and still provide a solid backing for the work piece during the broaching operation.

A second set of equalizing plungers 61 and 62 is provided to engage the walls of the two combustion chambers at the other end of the casting, and these plungers are in longitudinal alignment with the first set of plungers whereby they cooperate with them to act as stops to position the work. As shown in Figure 19, since all of these equalizing plungers engage the lower part of the casting, it is necessary in order to parallelly align the work with the broaching tool, that a fixed stop 63 be provided to engage the upper part of the casting, with the result that a form of three-point support is provided, and this is true because either pair of equalizing plungers may be considered as one point of support because of their equalizing ability.

The three-point support serves to properly align the casting, but it is necessary to provide additional means to prevent deflection of the casting under cut, especially at the upper left and right hand corners as viewed in Figure 19. This means comprises a pair of spring jacks or plungers 64 and 65 as shown in Figure 9, and the ends of these plungers are normally projected beyond the plane of the three-point supports by springs 66 when the fixture is unloaded. As the fixture is loaded, these plungers will be retracted by the casting, and although they exert some force on the casting, nevertheless it is not sufficient to interfere with the proper locating of the work.

Means have been provided for locking these spring jacks in whatever position they happen to be forced into by the casting, and this means comprises a pair of clamping rods 67 and 68, which are beveled at one end to engage beveled notches 69 formed in the side of plungers 64 and 65, and beveled at the other end to engage the tapered end of fluid actuated plunger 70.

The plunger 70 is actuated by a piston 71, slidably mounted in a small cylinder 72 carried by the work drum, and a piston rod 73 integral with the piston engages the end of the plunger 70. When fluid pressure is admitted to the lower end of cylinder 72, as viewed in Figure 9, the piston 71 moves the plunger upward to clamp the spring jacks; and when fluid pressure is admitted to the upper end of the cylinder, the piston rod 73 is retracted from the end of plunger 70. There is no positive connection between the piston and the plunger and therefore additional means are provided consisting of a pin 74, which is slidably mounted in the end of plunger 70 with one end in engagement with a fixed abutment 75, and the other end in engagement with a spring 76 confined in the bore in which the pin 74 slides. In other words, the spring 76 is constantly acting to retract the plunger 70 and it is only when the piston 71 has been retracted that the spring becomes effective.

In addition to the foregoing, it is necessary to provide additional means for locating the casting in the fixture for clamping purposes, and to this end a locating stop 77 has been provided, which stop is not carried by the drum but is mounted on a fixed part of the bed, as more particularly shown in Figures 2 and 19. Two additional stops 78 and 79 are provided for locating the work vertically with the result that the stops 79 and 77 cooperate to sort of form a corner into which the casting can be pushed by the operator to properly locate the same in the fixture.

For the purpose of holding the work in the fixture, a pair of upper clamping members 80 and 81 are provided, which have heads formed on the end thereof for engaging lugs 82 which project from the side of the casting; and a pair of pivoted clamping members 83 and 84, which also engage lugs 85 formed on the other side of the casting. The clamping members 83 and 84 act upwardly to force the casting against the stops 78 and 79 while the two clamping bolts 80 and 81 act to draw the casting in against the fixture.

The power operable means for actuating the clamping bolts 80 and 81 is shown in Figure 5, and since the means for actuating each bolt is the same, only one will be described. For instance, the bolt 80 is actuated by a piston 86 slidably mounted in a cylinder 87 and connected by a piston rod 88, having a beveled end 89, for actuation of a cross pin 90. This pin is beveled at both ends for transmitting motion to clamping plunger 91. The end of the clamping plunger has flattened sides 92 so as to pass through a cross slot formed in the end of the clamping bolt 80. A spring pressed pin 93 tends to urge the clamping bolt 91 toward the right and a spring 94 tends to urge the clamping bolt into a work releasing position. In addition, the flattened end of the clamping plunger 91 is beveled so as to engage the beveled side of the cross slot formed in the bolt 80, whereby upon admission of fluid pressure to the left hand end of cylinder 87, the clamping bolt 80 will be retracted or drawn into engagement with the work to clamp the same. When fluid pressure is admitted to the other end of the cylinder, pressure will be released from the parts and the above mentioned springs will be free to move the clamping bolt 80 into a work releasing position.

The same form of mechanism is provided for actuating the clamping bolt 81 including the piston 95 which is slidably mounted in a cylinder 96.

The clamping members 83 and 84 are pivotally mounted at the lower end of the fixture by means of a pin 97, as more particularly shown in Figure 4, and on that side of the pin opposite to the work, a bolt 98 is passed through the member 83 and threaded in the drum for the purpose of supporting spring 99, which is confined between the end of the clamping member 83 and a pair of locked nuts 100 threaded on the end of member 98. This spring tends to rotate the member 83 into a work releasing position. Referring to Figure 3, there is shown the fluid operable means for actuating these members which comprises pistons 101 and 102 slidably mounted in cylinders 103 and 104 respectively, and the pistons have bevel-ended piston rods 105 and 106, which engage the beveled ends of plungers 107 and 108 respectively. The ends of the plungers engage the ends of the clamping members 83 and 84 so that, upon admission of fluid pressure to the abutting ends of cylinders 103 and 104, the levers 83 and 84 will be rotated in a direction to clamp the work against the stops 78 and 79.

The fluid control circuit which governs actuation of the piston 71, shown in Figure 9, the pistons 86 and 95, shown in Figure 5, and the pistons 101 and 102, shown in Figure 3, is illustrated diagrammatically in Figure 17. Although only one manually operable control valve is provided in this circuit, it should be obvious that all of these pistons should not operate at the same time, but preferably in a certain sequence in order to insure proper position of the work. In other words, it is preferable that the pivoted clamp members 83 and 84 be operated first in order to insure that the work is brought up against the stops 78 and 79 and thereby properly position the lugs 82 under the heads of the plungers 80 and 81. After this has been accomplished, it is preferable that the clamping members 80 and 81 be actuated to draw the work in against the fixed stop 63 before the spring jacks 64 and 65 are sufficiently clamped to restrain this movement.

With this thought in mind, there has been provided, in addition to the main control valve 109, a pair of sequence interlocking valves 110 and 111.

A separate constant displacement pump 112 is provided for supplying fluid pressure to this circuit, and this pump is connected to pressure port 113 of valve 109, which also has a pair of exhaust ports 114 and 115. In addition, the valve 109 has a pair of ports 116 and 117 through which fluid is delivered or returned depending upon the position of the valve plunger 118 to the hydraulically actuated devices. When the valve plunger is in the position shown in Figure 17, it is in a work releasing position and the pressure port 113 is connected to port 116, whereby fluid will flow through branch channels 119, 120, 121, 122, and 123 to cylinders 103, 72, 104, 96, and 87 respectively. It is to be understood that fluid enters that end of each of these cylinders which will cause the respectively contained pistons to release the respectively connected devices, whereby the fixture is in condition to receive a new piece of work.

The fluid from the abutting ends of cylinders 96 and 87 will return through channel 124 and check valve 125 to channel 126; the returning fluid from cylinder 72 will flow through channel 127 and check valve 128 to channel 126, which channel also has directly connected thereto the opposing ends of cylinders 103 and 104, whereby all the returning fluid from these various cylinders will be conducted by channel 126 to port 117 of valve 109 which, at this time, is connected to exhaust port 115. When the operator is ready to clamp the work he shifts the plunger 118 of valve 109 to the right, as viewed in Figure 17, by means of the manually operable handle 129 which is pivotally mounted on the side of the drum, as more particularly shown in Figure 12. This will connect the pressure port 113 to port 117 and channel 126, whereby the pressure will immediately flow to the abutting ends of cylinders 103 and 104 and cause immediate actuation of the pivoted clamping members 83 and 84.

On account of the check valve 125 and 128 being closed, fluid can not pass to the other cylinders, and it is necessary that the pressure build up in channel 126 to a sufficient amount to operate the sequence interlocking valves. The sequence valve 111 has a plunger 130 which is normally held in the position shown in Figure 17 by a spring 131. Likewise the sequence valve 110 has a plunger 132 which is normally held in the position shown by a spring 133.

It will be noted that the channel 126 is directly connected by a branch line 134 to the end of valve 111 and by a second branch line 135 to the end of valve 110. Thus when the main control valve plunger 118 is shifted, the fluid pressure will immediately act on the ends of plungers 130 and 132 of the sequence interlocked valves. The springs of these valves are so set, however, that the plunger 130 will not shift until a certain predetermined pressure has built up in channel 126 due to completion of actuation of pistons 101 and 102. When this predetermined pressure has built up, the plunger 130 will be moved to the right, and branch line 134 will then be connected to port 136 whereby fluid will flow directly into channel 124 causing actuation of pistons 86 and 95.

The spring 133 in valve 110 is set higher than the spring in valve 111 whereby the piston 132 will not be actuated until the pressure builds up still higher, so that valve plunger 134 will be shifted later than the plunger 130. When this does occur, the branch line 135 will be connected to port 137, and the fluid will flow through channel 127 to the cylinder 72 to actuate the piston 71 and thereby the spring jacks 64 and 65.

It will now be evident that the work fixture 61 is adapted to receive the rough castings as they are fed to the machine by conveyor 55, and that it is provided with means for properly locating and supporting a casting therein, and that the drum 138, upon which this fixture is mounted, has self-contained therein a power operable control circuit for clamping and securing the work in desired position for broaching one side thereof.

When the drum 138 has been indexed through an angle of 180°, as viewed in Figure 4, it will be apparent that the fixture 53 will be moved to station A and occupy the same position with respect to the conveyor 55 that the fixture 51 now occupies. In other words, this fixture is also adaptable for receiving rough castings from the conveyor and it is provided with the same locating and clamping means and the same hydraulic control circuit that the fixture 51 is provided with, and therefore it is not believed to be necessary to repeat the description of these parts.

The other two fixtures 52 and 54 carried by the drum 138 are adapted to receive the semi-finished castings, which may be defined herein as those castings which have already been broached on one side. In other words, after the casting in fixture 53, as viewed in Figure 4, has been broached on one side, the drum 138 is indexed through an angle of 90° after which the casting is removed from fixture 53, reversed, and after another indexing of the drum through an angle of 90°, is reinserted in fixture 54. The means for locating and clamping the semi-finished castings in fixtures 52 and 54 in exactly the same and therefore only one of these will be described.

Referring to Figure 4, the fixture 52 is provided with two hardened locating strips 139 and 140 which extend longitudinally of the fixture, and they have locating faces which lie in the same vertical plane and against which the broached surface of the casting may be placed to properly align the opposite face for broaching. The fixture also has a horizontal locating surface 141 upon which the semi-finished casting may rest, and against which it is adapted to be clamped by pivoted clamping members 142. Adjacent one end of this fixture is another end stop 77 similar to the one shown in Figure 19.

The pivoted clamping members 142 are similar in construction to those for the fixture below and are operated by the same sort of mechanism, which is shown in detail in Figure 3, and operable by pistons 143 and 144 slidably mounted in cylinders 145 and 146 respectively. The circuit for controlling operation of these pistons is more particularly shown in Figure 11 and comprises a manually operable reversing valve 147 having a plunger 148 operatively connected to the manual control 149. This valve has the conventional pressure port 150, which is supplied by a pump 151; a pair of exhaust ports 152 and 153; and a pair of ports 154 and 155, the first of which is connected by channels to that end of cylinders 145 and 146 which, upon admission of fluid pressure, will cause unclamping of the work, and the other port is connected to the abutting ends of the cylinders so that, upon admission of fluid pressure thereto, the work will be clamped.

It will now be seen by reference to Figure 12 that there are four control valves mounted on the end of the drum for clamping the work in the various fixtures; and that the valves operable by handles 129 control the clamping of the rough castings, and that the valves controlled by the handles 149 control the clamping of the semi-finished castings.

In the operation of the machine one stroke of the broaching ram will affect simultaneously the broaching of two surfaces; that is, the first surface on a rough casting and a second surface on a semi-finished casting. The ram then stops and the drum 138 is indexed through an angle of 90°. As this indexing takes place a fixed pin 156, Figures 3 and 12, trips one valve control lever 129 and one control lever 149, thereby automatically unclamping both work pieces by the time they reach station D.

Referring to Figure 4, the work piece in fixture 54 will now be broached on both sides, and ready for removal from the fixture onto the inclined conveyor 157, upon which it will move by gravity away from the machine.

The other work piece in fixture 53 will be moved toward the right, as viewed in Figure 2, into an oscillatable cradle 158 which is supported to swing about the axis of a shaft 159. In order to hold the cradle in the horizontal position shown, it has integrally secured thereto a counterweight arm 160 upon which is adjustably mounted a counterweight 161. In addition, there is secured to the cradle a disc 162, Figure 20, in the face of which is formed a pair of notches 163 near the periphery of the disc and located 90° apart.

A spring pressed detent 164 is mounted in the support 165 for engagement with these notches to further assist in holding the cradle in either its horizontal position, or in a vertical position to which it will be swung clockwise, as viewed in Figure 1, by the operator for subsequent transfer of work into fixture 54 after another 90° indexing of the drum 138. In order to limit the movement of the cradle to the 90° swing, the plate 162 is cut away for 90° on its periphery, and a pin 166 is fixed in the support 165 for engagement of this cut-away portion to positively limit the swing of the cradle.

It will now be evident that if the work piece in fixture 53 is moved into the cradle, and the cradle rotated clockwise as viewed in Figure 1 through an angle of 90°, and the drum 138 indexed through an angle of 90° counterclockwise, that the work piece in the cradle will now be in alignment with the fixture 54, whereby upon subsequent transfer of the semi-finished work piece from the cradle into the fixture that the unfinished side of the work piece will be exposed for broaching, and the resultant effect is the same as if the operator had removed the semi-finished work piece from one fixture and turned it over and replaced it in the other fixture. It should be obvious that by means of this auxiliary cradle, that the reversing of the work is accomplished without any manual lifting on the part of the operator.

To facilitate removal of work from the fixtures at station D, a long cylinder 167 is mounted on top of the bed 20 is an aligned position with the work, and this cylinder contains a piston 168 and rod 169 to the end of which is attached a head 170 which is sufficiently wide to engage the ends of both work pieces.

As shown in Figure 17, admission of fluid pressure to this cylinder is controlled by a valve 171 which has a plunger 172 normally urged by a spring 173 into a position causing retraction of the piston. When the valve plunger 172 is shifted to the right, as viewed in Figure 17, by the handle 174, the pressure port 175 which is supplied from a constant displacement pump 176, is connected to channel 177 whereby fluid will flow to the left hand end of cylinder 167 and cause the piston 168 to advance and remove both work pieces from the fixtures.

When the operator lets go of the handle 174, which is located adjacent the cylinder 167 as shown in Figure 2, the spring 173 will reposition the valve plunger 172 to connect port 175 to the right hand end of cylinder 167, and thereby automatically cause retraction of the piston 168.

In order to prevent longitudinal shifting of the work while under cut at station C, a pair of positive stops has been provided adjacent the ends of the work pieces, as more particularly shown in Figure 10, and consists of two segment blocks 178 and 179 which are pivotally supported at 180 and 181 on the bed 20, and springs 182 act on these members to normally hold them in the full line position in which they are shown in this figure. As viewed in this figure, the work pieces, as they index, move upward relative to the support 20 and as they engage these segment blocks they slightly rotate them into their dot-and-dash line position, which thus places their work abutting faces in substantial parallelism with the end faces of the work. It will be obvious that the springs serve the purpose of holding the blocks in such a position that during indexing they will not catch on the corners of the work and thereby cause damage to the parts.

Referring to Figure 3, the drum 138 has integral axially extending journals 183 and 184, which are supported on anti-friction bearings 185, mounted in the end brackets 186 and 187 respectively. The end bracket 186 also contains the mechanism for indexing the drum. This mechanism is actuated by a piston 187', as shown in Figure 6, which is slidably mounted in a cylinder 188, and a piston rod 189 which is connected to a slide 190 guided for longitudinal movement in the bracket 186, as more particularly shown in Figure 3. This slide operates a Geneva mechanism, comprising a roller 191 attached to the slide 190, and a crank arm 192 secured to the end of shaft 193 in which is formed a slot 194 for receiving the roller 191.

The shaft 193 has a gear 195 keyed to the other end thereof and intermeshing with a gear 196 integral with the ratchet plate 197. This ratchet plate carries a spring pressed ratchet pawl 198, which is adapted to cooperate with notches 199 formed on the hub 200 of locking plate 201, the latter being keyed to the drum supporting shaft. The plate 201 has four radially extending locking notches 202 formed in the periphery thereof for engagement by the locking plunger 203.

This locking plunger is slidably mounted in a sleeve 204 mounted in a bore of the bracket 186 and is normally urged upward into locking position by a spring 205 confined between the lower end of the plunger 203 and a shoulder 206 integral with the casting. Since it would require an exceptionally strong spring to drive the locking bolt home on account of the weight of the drum and supported work pieces if the same were slightly out of alignment, additional means have been provided for assisting in this function so that the spring 205 does not have to be made so strong. This auxiliary means is shown in Figure 17 and comprises a piston 207 slidably mounted in a cylinder 208, and with the upper end thereof abutting the lower end of a push rod 209 which is threaded into the locking plunger 203.

In order to maintain the piston 207 in constant engagement with the end of push rod 209, a plunger 210 is slidably mounted in the end of the piston 207 and a spring 211 is inserted in the plunger bore between the end of plunger 210 and the piston 207 so as to constantly urge the latter upward into engagement with the lower end of the push rod. The lower end of the cylinder has a port 212 which is connected by channel 213 to port 214 of an interlock control valve 215.

This valve has a plunger 216 which is normally urged upward by a spring 217, but when the plunger is depressed by a dog 218 carried by the indexing slide 190, the port 214 is connected by an annular groove 218' to pressure port 219. In other words, when the slide 190 completes one reciprocation, the dog 218 depresses the plunger 216 and connects pressure to the lower end of the cylinder 208 to assist the spring 205 to drive home the locking plunger 203.

In order to prevent friction of the ratchet pawl 198 from causing backward movement of the parts, an additional spring pressed pawl 220 is provided for engaging one side of the notches 202, thereby preventing return movement of plate 201, but the end of the pawl is beveled at 221, whereby advancing movement of the plate 201 will automatically cause retraction of the pawl 220.

In operation, when the piston 187' moves toward the right as viewed in Figure 6 and thereby through the Geneva mechanism causes rotation of the ratchet plate 197 in a clockwise direction to pick up the next notch 199, a cam surface 222 formed on the ratchet plate 197 engages the end of the locking plunger 203 and effects its withdrawal from the locking notch by the time that the ratchet pawl 198 engages the next notch 199. Upon return movement of the plunger 187' to the left the parts are indexed through an angle of 90° and at the proper time a control dog 218 depresses the plunger 216 to cause hydraulic actuation of the locking bolt, thereby completing one indexing movement.

This machine does not operate on a continuous repeating cycle, but executes substantially one-half of its cycle and then automatically stops, after which the operator must throw a starting lever to cause the machine to automatically complete the other half of its cycle. The sequence of happening is the same for each half cycle, except for a difference in the direction of movement of some of the parts. The cycle is so arranged that when the operator throws a starting lever the first thing that occurs is the indexing of the work support or drum. In other words, the piston 187' moves in cylinder 188 first to the right to effect the ratchet stroke of the indexing mechanism, and then to the left to index the drum and then by means of automatic trip mechanism it comes to a stop.

Simultaneously and automatically, by means of other trip mechanism, a pilot valve is operated which throws the main control valve 32 for the broaching ram piston, and causes the broaching ram to execute one stroke, that is, either a cut stroke or a return stroke, and when this stroke is completed, additional trip mechanism is operated to stop the ram. The parts are again at rest, and it is necessary for the operator to throw the starting lever again to start the next half cycle of operation.

The starting lever 223 is pivotally mounted on one end of the machine base, as shown in Figure 1, and this lever is connected by a link 224 and a crank arm 225 to a rotatable shaft 226. This shaft terminates in a control box shown in Figures 14 and 15 where it has keyed thereto a ball-ended crank 227 engaging a notch formed in the end of piston valve plunger 228 of index control valve 229. Also keyed on the shaft 226 is a detent plate 230 having two notches which are successively engaged by the pivoted detent 231, which is held in engagement with these notches by a spring 232. In addition, there is keyed to the shaft 226 an interlock plate 233 which has a shoulder 234 for engaging an interlock lever 235. A spring pressed plunger 236 acts on the end of this lever to continuously urge the same into contact with the periphery of the interlock plate.

On the other side of the pivot 237, about which the lever 235 swings, is a fluid operated plunger 238 which is adapted to move the interlock lever out of engagement with the plate so as to permit rotation of shaft 226.

When the machine is in condition for starting, fluid pressure is behind the piston 238 so as to hold the interlock lever 235 out of engagement with the notch 234, and the valve plunger 228 is in the position shown in Figure 15. In this position the pressure port 239 which is connected by channel 240 to the constant displacement pump 176 as shown in Figure 17, is connected by the annular groove 241 to port 242 which has a channel 243 leading therefrom to the right hand end of cylinder 188. Channel 244 leading from the other end of the cylinder to port 245 of the valve, is connected by the annular groove 246 in plunger 228 to exhaust port 247.

When the operator throws the starting lever 223 downward, as viewed in Figure 1, he rotates the shaft 226 in Figure 15 in a clockwise direction thereby shifting the valve plunger 228 toward the right and connecting the pressure port 239 to port 245, and also connecting port 242 to exhaust port 248. Fluid pressure thus flows into the left hand end of cylinder 188 causing the piston 187' to move toward the right. When the piston 187' reaches the end of its stroke and the ratcheting has been completed, a trip dog 249 carried by the slide 190 depresses trip plunger 250, thereby rotating the bell crank 251 in a clockwise direction, as viewed in Figure 15, and shifts the plunger 228 back to its starting position, which automatically reverses the direction of movement of piston 187.

Near the completion of the return movement another trip dog 252, carried by the slide 190, and shown in Figure 14, depresses a plunger 253. This plunger carries a ratchet pawl 254 which engages the teeth on a ratchet wheel 255 keyed to a shaft 256, and thereby indexes a cam 257 carried by the shaft through an angle of 45°. This shaft also carries a star wheel 258 against which rides a spring pressed detent 259 to hold the shaft in any one of its indexible positions.

The cam 227 has a cam path 260 cut in its periphery, as more particularly shown in Figure 16, and a follower 261 secured to the end of valve plunger 262 rides in this cam path. It should be obvious upon examination of the form of the cam path as shown in Figure 16, that the plunger 262 has two positions and upon each indexing movement it is shifted from one of these positions to the other thereof.

Therefore, during one reciprocation of the indexing cylinder piston 187, valve 262 is in one position and during the next cycle it is in its other position. The function of this valve is to cause hydraulic shifting of a pilot valve which in turn controls the shifting of the main control valve 32 for the broaching ram piston as previously described in connection with Figure 11. The manner in which this is accomplished will now be explained.

Fluid pressure for actuating the pilot valve is taken from pressure channel 240 and delivered to port 263 to an automatic follow-up valve 264. This valve has two ports 265 and 266 connected by channels 267 and 268 respectively to ports 269 and 270 of valve 271, in which is contained the plunger 262. It will be seen that the plunger 272 of valve 264 has an annular groove 273 whereby the pressure port 263 is connected to either port 269 or port 270 of valve 271. In addition the valve plunger 272 has a pair of annular grooves 274 and 275 which serve to alternately connect ports 266 and 265 to reservoir ports 276 and 277 respectively. Thus the position of plunger 272 determines whether port 269 or port 270 of valve 271 will be a pressure port.

If the valve plunger 272 is in the position shown in Figure 17, then the port 269 becomes the pressure port and when the machine is started this pressure port will be closed because the plunger 262 will be in its right hand shifted position. This means that port 278 which is connected by channel 279 to the left hand end of cylinder 280 is connected to the exhaust port 281 by the annular groove 282. Also the port 283 which is connected by channel 284 to the right hand end of cylinder 280 is connected to port 270. But the latter port is connected by annular groove 274 in plunger 272 to the exhaust port 276 with the result that both ends of cylinder 280 are connected to reservoir and no fluid pressure is acting upon opposite ends of its contained valve piston 285.

Now then after the indexing operation has been performed and the cam 257 ratcheted through an angle of 45°, the valve plunger 262 is shifted to the left. This immediately connects pressure port 269 to channel 279 whereby the piston valve 285 is shifted to the right as viewed in Figure 17. At the completion of this shifting movement, a port 286 is uncovered whereby the pressure fluid entering the cylinder 280 to actuate the piston 285 can now continue through channel 287 to the left hand end of valve 264 and shift the plunger 272 thereof into its right hand position, thereby disconnecting pressure from port 269 of valve 271 and making port 270 of that valve a pressure port. But at this time, the port 270 is closed so that nothing happens as a result of changing the nature of the port.

At the same time that the port 286 was uncovered by the piston 285, an annular groove 288 in plunger 285 interconnected a port 289, to which channel 290 leads from the right hand end of valve 264, with port 291, to which return line 292 is connected. Therefore, when fluid is admitted to the left end of cylinder 264 to shift the plunger 272 toward the right the opposite end of the cylinder is connected to reservoir to permit this movement to immediately take place. In order to hold the plunger 272 in either one of its two positions a spring pressed ball 293, mounted in the wall of cylinder 264, cooperates with detent grooves 294 and 295 formed in the periphery of plunger 272.

Thus the dog 252 on the slide 190 indexes the cam 257 and thereby shifts the valve plunger 262 into a position to connect pressure to one end of cylinder 280 and shift the contained piston thereof to the right as viewed in Figure 17, and at the completion of this shifting movement, cause operation of valve plunger 272 into a position to cut off the pressure from cylinder 280, thereby preventing the dissipation of pressure through all of these parts.

The piston 285 functions as a shifter for moving a plunger 296 of a pilot valve 297, which pilot valve controls hydraulic shifting of the ram reversing valve shown in Figure 11. To this end the piston 285 has connected thereto a ball-ended lever 298, which is keyed to shaft 299.

Referring to Figure 2, this shaft has a crank arm 300 keyed thereto which is connected by a link 301 to a crank arm 302 keyed to the end of shaft 303, which shaft, as shown in Figure 17, has a ball-ended lever 304 keyed thereto and engaging a notch in the end of the pilot valve plunger 296. The connections are such that when the plunger 285 is shifted to the right the pilot valve plunger 296 will also be shifted to the right. An interlock plate 305 secured to the shaft 303 for preventing inadvertent operation of the pilot valve plunger and to this end the plate 305 has a pair of shoulders 306 and 307 formed thereon and adapted to be normally engaged by bell cranks 308 309 respectively. In other words, in order to rotate the shaft 303 in either direction from the central position shown, one or the other of the bell cranks must be moved to a non-interfering position.

When the machine is in condition for operation of the broaching ram these interlocks are removed automatically. For instance, after the locking bolt of the index mechanism has returned to the locking position, an annular groove 310 formed in the plunger 207 interconnects a pair of ports 311 and 312, the port 312 having a channel 313 connected thereto which leads to a cylinder 314 having a contained piston 315 for actuating the bell crank 309.

As previously mentioned when the index slide is in its return position, the interlock plunger 216 is held in a depressed position by the dog 218, whereby the port 219 which receives fluid under pressure directly from pump 176 is connected to port 214, which in turn is connected by channel 213 to port 311. Since port 311 is now a pressure port, fluid will flow to cylinder 314 and thereby remove the interlock 309. The shaft 303 is thus free to be moved in a counterclockwise direction and thereby through the lever 304 shift the pilot valve plunger 296 to the right.

Shifting of the pilot valve plunger to the right connects a pressure port 316, to which pump 176 is connected, to port 317 by means of the annular groove 318 formed in the plunger. A second annular groove 319 formed in the pilot valve plunger connects port 320 to exhaust port 321. The effect of this is to cause shifting of the reversing valve plunger shown in Figure 11 because the channel 322 which is connected to port 317 leads to the right hand end of valve 32, and fluid in the left hand end of valve 32 may return through channel 323 to port 320 and thereby to reservoir.

Attention is invited to the fact that the channel 322 has a branch 324, which is connected to the right hand end of valve 48, which contains the shuttle valve 49. This will shift this valve to the left into the position in which it is shown, while any fluid in the other end of the valve may pass to reservoir through channel 325 which is a branch of channel 323. The result of this is automatic starting of the broaching ram because pressure port 38 of the valve is now connected to port 31 and fluid will flow through channel 29 into the right hand end of cylinder 27 and exhaust fluid from the other end of the cylinder will return through channel 28, port 30, cannelure 46, and port 47 to reservoir 36.

Another effect of shifting the pilot valve plunger 296 to the right, was the disconnection of a pressure port 326 in valve 297 from port 327, which has a channel 328 leading therefrom to port 329 of an interlock valve 330. Before the ram started, a dog 331 carried by the ram was in a position to hold the plunger 332 of interlock valve 330 in the depressed position in which it is shown in Figure 17, whereby an annular groove 333 formed in the plunger interconnected port 329 with port 334.

It was this interconnection that supplied fluid pressure to cylinder 335 which contained the piston 238, previously referred to in connection with Figure 15. In other words, this piston held the interlock lever 235 out of engagement with the interlock plate 234.

It will now be evident that when the pilot valve plunger is shifted into an operating position to cause movement of the broaching ram, that fluid pressure is cut off from cylinder 335. In addition, as soon as the ram has moved a sufficient amount for the dog 331 to pass out of engagement with the interlock plunger 332, the port 334 becomes interconnected by the groove 333 to exhaust port 336 thereby releasing any fluid pressure in cylinder 335 and permitting the spring pressed plunger 236 to return the interlock lever 235 into a locking position thereby making it impossible for the operator to manually actuate the starting lever 223 with any effect.

It will now be obvious that the broaching ram has started on its cutting or feeding stroke and that an interlock has become effective to prevent actuation of the starting lever and thereby initiation of another indexing movement of the carrier while the broaching or cutting operation is in process.

Attention is invited to the fact that when the shaft 303 was rotated to shift the pilot valve plunger into a feed position, that a pinion 337 keyed to the shaft and interengaging rack plungers 338 and 339 moved the rack plunger 339 upward as viewed in Figure 17, because of counterclockwise rotation of shaft 303 and moved rack plunger 338 downward into a position to be engaged by a dog carried by the ram.

In addition, a manually operable control lever 340, which is connected with shaft 303 for operation thereof at will and which serves mainly as an emergency stop lever, will be thrown from its central or stop position counterclockwise or to the left as viewed in Figure 17 into a feed position and since the lever is interconnected so as to be directional, it indicates that the ram is moving toward the left.

While the broaching or cutting stroke is in progress, it is possible for the operator to throw the lever 340 back to a central position to stop the ram, but further movement beyond this position to cause return movement of the ram will be prevented by the interlock 308, which is in the path of the shoulder 306 formed on the interlock plate 305. When the operator throws this lever into a neutral position, he repositions the pilot valve plunger 296 in the central position in which it is shown in Figure 17 and thereby interconnects the pressure port 316 with both of the control channels 322 and 323. As shown in Figure 11, this will admit pressure to both ends of valve 32.

It will be noted that both ends of the plunger of this valve are materially reduced in diameter so as to be provided with shouldered sleeves 341, which are adapted to abut the ends of small cylinders 342 in which the shouldered end of the sleeves move. These sleeves are of such length that when fluid pressure is admitted to both cylinders 342, and the sleeves are moved toward one another until the shoulders thereon abut the end of their respective cylinders that they will position the valve plunger in the central or stop position in which it is shown in Figure 11. In other words, regardless of which side of the center the valve plunger happens to be in, when the pressure is admitted to cylinders 342 simultaneously, the plunger 33 will be moved back to a stop position.

Since branch lines 324 and 325 are connected to channels 322 and 323 respectively, equal pressure in these last named channels means that equal unit pressure will be applied to opposite ends of the shuttle valve plunger 49. It will be noted from Figure 11, that one end 343 of this plunger is larger in diameter than the end 344 so that even although the unit pressure is the same, the larger end area of piston 343 will cause the plunger to remain in its left hand position or, if not already there, to be shifted into such position. Centralization of control valve plunger 32 will disconnect the pressure port 38 from both ends of the ram cylinder 27, but will interconnect pressure port 40 with the exhaust port 43, whereby the fluid delivered by pump 34 may be returned to reservoir through a low-resistance path and thereby reduce the load on pump 34, as well as save heating of the oil which otherwise would occur if returned to the reservoir through a relief valve.

Upon completion of the cutting stroke, a dog 345 will engage plunger 338 and move the same upward a sufficient amount to reposition pilot valve plunger 296 in its stop position and produce the same results just described in connection with movement of lever 340 into its stop position. When the ram reaches the end of its stroke, another dog 331' will depress plunger 332 so that when the ram has completed its cutting stroke, pressure from pump 176 will flow through port 326 of the pilot valve 297 to port 327 and channel 328 to port 339 of the interlock valve 330. This port is now interconnected to the interlock cylinder 335 whereby the contained plunger 238 thereof will remove the interlock lever 235 thereby making it possible for the operator to initiate indexing of the work holder by depressing control lever 223. If and when the operator has completed the loading of work in the two fixtures at station A, which he is presumably doing during the cutting stroke of the ram, he depresses the control lever 223 causing an indexing movement of 90° of the work holder to take place in the manner described heretofore.

At the completion of this indexing movement, there will be no work in the path of the ram so that it may now be returned, which means that the pilot valve plunger 296 should now shift to the left and the interlock 308 should be withdrawn from its interlock position. This is effected in the following manner. Referring to Figure 13, a cam plate 346 is secured to the end of the work drum supporting shaft and provided with two diametrically opposed cam projections 347 and 348 which project from the periphery of the cam for the purpose of depressing an interlock plunger 349 when they contact the same.

When the cam plate 346 is assembled with its shaft, it is so oriented with respect to the work fixtures that the projections 347 and 348 lie in the same radial plane as the fixtures. Therefore after the 90° indexing movement just explained has been completed, the projection 348 will engage and depress the interlock plunger 349. This plunger has an annular groove 350 shown in Figure 17 which, upon depression of the plunger, will interconnect port 351 with port 352 which has a channel 353 connected therewith and leading to interlock cylinder 354. This cylinder has a contained plunger 355 for operating the interlock bell crank 308. Thus upon completion of the indexing movement, pressure which is now present in channel 313 and connected to port 351, will flow to the interlock cylinder 354 and remove the bell crank 308 from the path of movement of shoulder 306 on interlock plate 305. This will take place at the same time that pressure is admitted through channel 284 to the right hand end of cylinder 280 which contains the actuating plunger 285 for rotating the shaft 303 which operates the pilot valve 296.

When the pilot valve shifts to the left, pressure port 316 will be connected to port 320 and thereby to channel 323, which will shift the plunger of control valve 32 to the right and also shift the shuttle valve plunger 49 to the right. This will cause fluid pressure to flow into the left hand end of ram cylinder 27 to cause return movement of the ram and the fluid returning from the other end of the cylinder 27 through channel 29 will be interconnected by the annular groove 356 in the shuttle valve plunger to exhaust port 50. This is necessary because the spool 357 on the main control valve plunger 33 is in the position to close port 31.

When the pilot valve plunger 296 is in its left hand position, it also connects ports 317 and 327 to exhaust port 358 which, it will be noted, is a wide port, and the spool 359 which is narrower than the port, will be central thereof to make this possible. This means that fluid in the right hand end of cylinder 48 and of main control valve 32 may return to reservoir through channel 322 and that the pressure in interlock cylinder 335 will also be free to pass to reservoir so that the interlock lever 235 will now be in a position to prevent another indexing movement during return movement of the ram. It is to be noted, however, that both interlocks 308 and 309 are in a non-effective position whereby the operator is free to actuate the manual control lever 340 in either direction and it is therefore possible for him to stop the ram during its return movement and even cause a movement of the ram in a feed direction. In automatic operation, the ram will continue its return movement until a dog 360 actuates plunger 339 and returns the pilot valve 296 to a central position when the ram will stop.

While this return movement is in progress, the operator is causing the removal of the finished work piece onto the inclined conveyor, and of the semi-finished work piece onto the swinging cradle by means of the power operable work ejecting mechanism controlled by valve 172.

The ram having returned to its starting position and the work having been removed from the fixtures located at station D, the operator actuates the starting lever 223 to cause another indexing movement of 90° and automatic starting of another cutting cycle. During this last indexing movement, the interlock plunger 349 was released and will remain released during the cutting stroke thereby causing the interlock 308 to return to its effective position and thereby prevent return movement of the ram while the work is in engagement with the broaching tools.

There has thus been provided an improved broaching machine for the purposes intended which is automatic in operation; which is capable of handling heavy work pieces without causing undue fatigue of the operator when loading the machine; and which is provided with a sufficient number of interlocking features that the machine is substantially fool-proof in operation.

That which is claimed is:

1. In a machine tool having a fluid operable ram and a cutting tool supported thereby, the combination of power operable means for reciprocating said ram, including a control having a stop position and operating positions on either side thereof, an indexible work support for successively presenting work to the cutting tool, an automatically operable indexing mechanism for indexing said work support, means operable by said mechanism upon completion of each indexing movement for shifting said control member from its stop position alternately to its operating positions whereby the ram will move in one direction after one indexing of the work support and in an opposite direction after the next indexing of the work support, means operable by the ram for shifting said control member to its stop position, and manually operable means for initiating the next indexing movement after the ram stops.

2. In a broaching machine having a fluid operable broaching ram and an indexible work support for successively presenting work to the ram, the combination of control means for effecting an automatic cyclic movement of the ram, including a three-position control valve, a pilot control circuit for shifting said valve, an indexing mechanism for the work support, an alternating one-stroke mechanism for the pilot valve, and means operable by the indexing mechanism upon completion of an indexing movement to automatically set in operation said alternating mechanism to effect shifting of said pilot valve.

3. In a broaching machine, a fluid operable broaching ram, an indexible work support including a power reciprocable member having indexing and ratcheting strokes, and ratchet operable means actuable by said member for causing strokes of the broaching ram in opposite directions upon successive actuations of said ratchet operable means.

4. In a broaching machine having a reciprocable ram and a broaching tool mounted thereon, the combination with power operable control means for shifting said ram, including a control member having a plurality of positions, of an indexible work support mechanism, power means for effecting intermittent indexing movements of said mechanism, and means to automatically transmit motion from said indexing mechanism to said control member, including an alternating one-stroke mechanism having direction determining means and a cam actuator therefor, operable by the indexing mechanism for sequentially effecting different directions of movement of said ram control member.

5. In a broaching machine having a power reciprocable broaching ram and an indexible work support, the combination of control means, including a power operable indexing mechanism for said work support, a starting lever for said mechanism, means operable by said mechanism upon completion of an indexing movement to automatically start power movement of said ram, and an interlock rendered effective upon movement of the ram to lock said starting lever, whereby another indexing movement will be prevented during movement of the ram.

6. A broaching machine having a broaching ram, an indexible work support, separate power operable means for moving the ram and indexing the support, a first interlock to prevent movement of the ram during operation of said indexing mechanism, and a second interlock to prevent operation of said indexing mechanism during movement of said ram.

7. A broaching machine having in combination a broaching ram, an operating control circuit therefor, including a control member, a work support for carrying work into and out of a broaching position, an interlock rendered effective upon movement of said work to a broaching position to prevent movement of said control member in one direction and means responsive upon movement of said work out of its broaching position to remove said interlock.

8. A broaching machine having a broaching ram, a work support for moving work into and out of a broaching position with respect to said ram, a control member for determining power movement of said ram in opposite directions, said control member having a stop position, a pair of interlocks for said control member, means responsive during movement of said work to or from the broaching position to render both of said interlocks effective to prevent movement of said control member, means operable while the work is in broaching position to render one of said interlocks ineffective whereby said control member may cause a feeding movement of the broaching ram, and means operable when the work is in a non-broaching position to render both of said interlocks ineffective whereby the ram may be moved in either direction.

9. A broaching machine having a broaching ram, a work support for moving work to and from a broaching position with respect to said ram, power operable means for shifting said ram, including a control member having a stop position and operating positions on either side thereof, fluid operable means for shifting said control member from any one of said positions to any other thereof, including a three-position pilot member, means responsive during movement of the work support either to or from a broaching position to render both of said interlocks effective, means operable while the work is in broaching position to render one of said interlocks ineffective, means responsive when the work is out of broaching position to render both of said interlocks ineffective, and manually operable means for shifting said ram control member at will to a stop position.

10. In a broaching machine having a support and a broaching ram reciprocable on said support, the combination of a drum indexibly mounted on a shaft extending parallel to the direction of ram movement, and automatic control means for sequentially indexing said drum and causing execution of one stroke of ram movement and means for effecting subsequent indexing of the drum prior to return movement of the ram.

11. In a broaching machine having a support and a ram slidably mounted thereon, the combination with power operable means for moving the ram in one direction on a cutting stroke and in the other direction on a return stroke, of an indexible work supporting drum, a shaft supporting said drum for movement about an axis parallel to the direction of ram movement, power operable means for indexing said drum, and an alternator responsive to each indexing movement of the drum for initiating movement of the ram whereby after one indexing of the drum the ram will feed in a cutting stroke, and after the next indexing the ram will return.

MILLARD ROMAINE.